(12) United States Patent
Cyprich

(10) Patent No.: US 8,038,814 B2
(45) Date of Patent: Oct. 18, 2011

(54) APPARATUS AND METHOD FOR PROMOTING CLEANLINESS IN COMMERCIAL AND INSTITUTIONAL ENVIRONMENTS

(76) Inventor: Thomas J. Cyprich, Wyoming, PA (US)

( * ) Notice: Subject to any disclaimer, the term of this patent is extended or adjusted under 35 U.S.C. 154(b) by 680 days.

(21) Appl. No.: 12/184,937

(22) Filed: Aug. 1, 2008

(65) Prior Publication Data
US 2010/0028620 A1 Feb. 4, 2010

(51) Int. Cl.
*B32B 5/00* (2006.01)
(52) U.S. Cl. ............... 156/60; 156/1; 156/157; 220/571
(58) Field of Classification Search ............... 156/1, 60, 156/157; 220/571
See application file for complete search history.

(56) References Cited

U.S. PATENT DOCUMENTS

| | | |
|---|---|---|
| 4,574,977 A | 3/1986 | Ellis |
| 5,011,007 A | 4/1991 | Kenimer |
| 5,434,339 A | 7/1995 | La Motte |
| 5,605,247 A | 2/1997 | Earnshaw |
| 5,868,270 A | 2/1999 | Sandaj |
| 5,883,300 A | 3/1999 | Johnson |
| 6,607,805 B1 | 8/2003 | Clark |
| 6,793,092 B1 | 9/2004 | Hayakawa |
| 6,938,790 B2 | 9/2005 | Hughes |
| 6,938,792 B2 | 9/2005 | Gerger |
| 7,124,772 B1 | 10/2006 | Browning |
| 7,374,062 B2 | 5/2008 | Van Romer |

*Primary Examiner* — Brent O'Hern
(74) *Attorney, Agent, or Firm* — William H. Eilberg

(57) ABSTRACT

A mat, to be placed beneath an appliance, has a base layer, preferably made of cardboard, a liquid-resistant layer, preferably of plastic, and a layer of batting. The layers are held together by a peripheral rim. The periphery of the mat includes straight and curved portions, such that when two similarly constructed mats are placed in abutment, the curved portions define areas not covered by the mats. Thus, the mats can be placed under an appliance, without disturbing the legs of the appliance, while still covering a majority of the area under the appliance. The mats provide containment for spills of liquid from the appliance, and also define barriers for deflecting food items which might otherwise become lodged beneath the appliance.

5 Claims, 2 Drawing Sheets

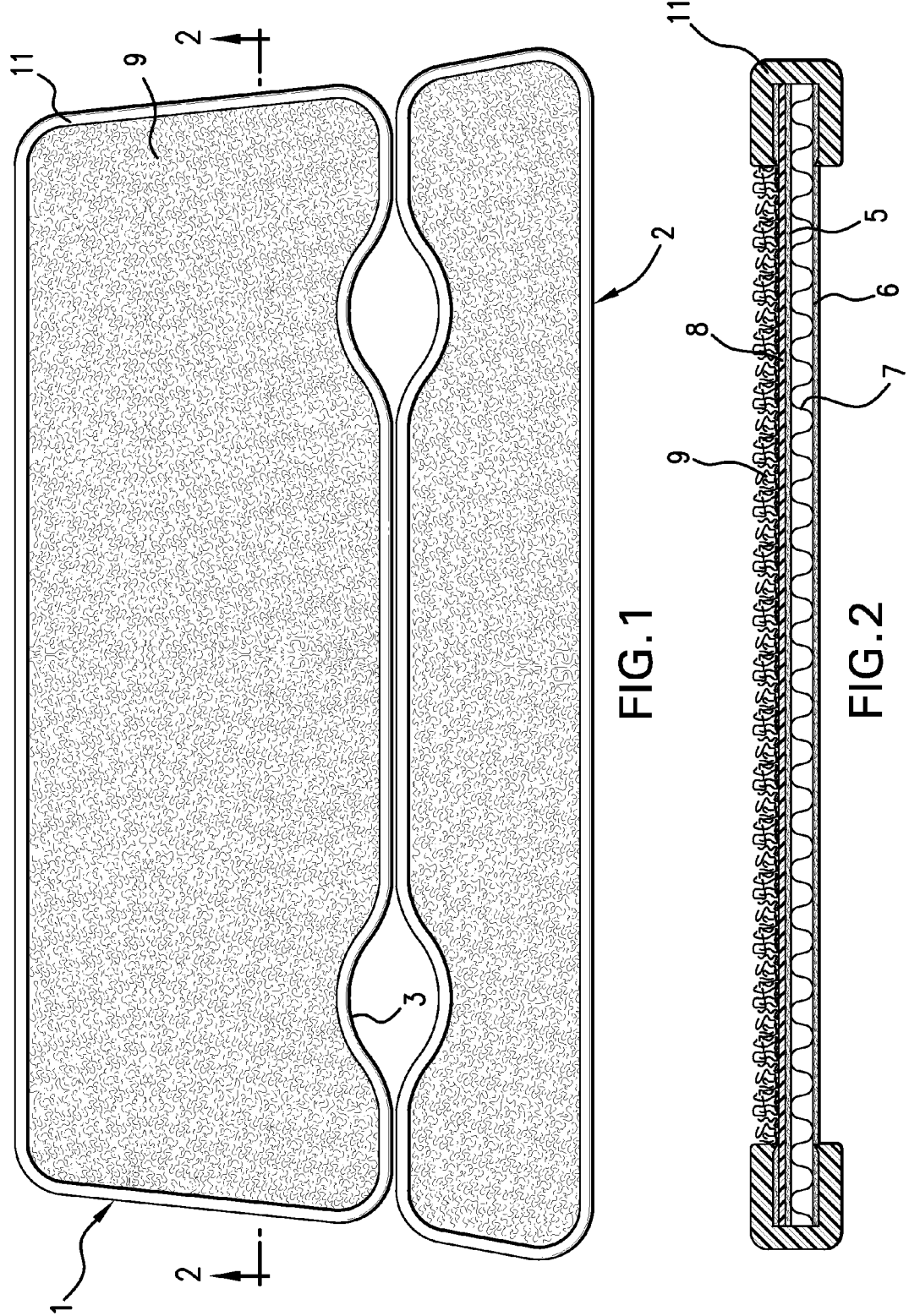

APPARATUS AND METHOD FOR PROMOTING CLEANLINESS IN COMMERCIAL AND INSTITUTIONAL ENVIRONMENTS

BACKGROUND OF THE INVENTION

The present invention relates to the field of cleaning of commercial and institutional establishments, especially those which handle or process food.

A commercial food establishment, such as a fast-food restaurant, produces a considerable amount of debris which must be periodically removed. For example, a commercial cooking apparatus is likely to leak or splatter liquids, such as frying oil. Also, pieces of food often fall to the floor, and then become lodged under various fixtures, usually in very inconvenient locations. These problems often comprise health code violations, and eventually lead to health hazards, so they must be addressed promptly.

Various patents in the prior art have dealt with the problem of cleaning areas where food is prepared. In particular, it has been known to provide a mat which sits underneath a cooking apparatus, such as a barbecue grill, the mat comprising means for containing spills. Examples of such products are shown in U.S. Pat. Nos. 5,868,270 and 6,607,805, the disclosures of which are incorporated by reference herein. Other patents, such as U.S. Pat. Nos. 4,574,977, 5,434,339, and 5,605,247 illustrate the concept of a drip tray or mat for catching and containing spills. The disclosures of the latter patents are also incorporated by reference herein.

The present invention provides an improved device and method, particularly suited for use in restaurants, for maintaining the cleanliness of such establishments, while minimizing the effort required.

SUMMARY OF THE INVENTION

The present invention includes a mat to be placed beneath an appliance. The mat includes a base layer, which may be made of cardboard, and a liquid-resistant layer, which may be formed of plastic, overlaying the base layer. A layer of batting is disposed over the plastic layer. The three layers are then held together by a rim which extends substantially around the periphery of the base layer.

The periphery of the mat is formed with straight portions and curved portions, such that a plurality of mats can be installed beneath the appliance, without disturbing the appliance in any way. In particular, the curved portions define regions which are not covered by the mats, so that the mats can be installed around the legs of the appliance.

The invention also includes the combination of the appliance and a plurality of mats, each made as described above. A majority of the area beneath the appliance is covered by the mat, thereby providing means for containing spills, and for deflecting pieces of food which, in the absence of the mat, might become lodged under the appliance.

The invention also includes the method of maintaining cleanliness beneath an appliance, the method comprising positioning at least two mats under the appliance, in such manner as to cover a majority of the area beneath the appliance. In particular, the mats have straight portions and curved portions, and the mats are positioned such that the curved portions coincide with the positions of the legs of the appliance. The mats, when so positioned, occupy most or all of the area beneath the appliance, but do not cover the area directly under the legs. Thus, the mats can be periodically removed and replaced, all without ever moving the appliance.

The present invention therefore has the primary object of promoting cleanliness in commercial establishments, especially restaurants and other facilities which handle food.

The invention has the further object of providing a mat for containing spills from appliances, the mat including multiple layers.

The invention has the further object of providing mats to be placed beneath an appliance, wherein the mats can be positioned to cover a majority of the area under the appliance without disturbing the appliance.

The invention has the further object of providing mats to be placed beneath an appliance, wherein the mats can be easily removed and replaced.

The invention has the further object of reducing the cost of maintaining cleanliness in a restaurant or other establishment which handles food.

The invention has the further object of enhancing the cleanliness of an establishment which handles food.

The reader skilled in the art will recognize other objects and advantages of the present invention, from a reading of the following brief description of the drawings, the detailed description of the invention, and the appended claims.

BRIEF DESCRIPTION OF THE DRAWINGS

FIG. 1 provides a perspective view of a pair of mats, made according to the present invention.

FIG. 2 provides a cross-sectional view of one of the mats of the present invention, taken along the line 2-2 of FIG. 1.

DETAILED DESCRIPTION OF THE INVENTION

Figure 3:
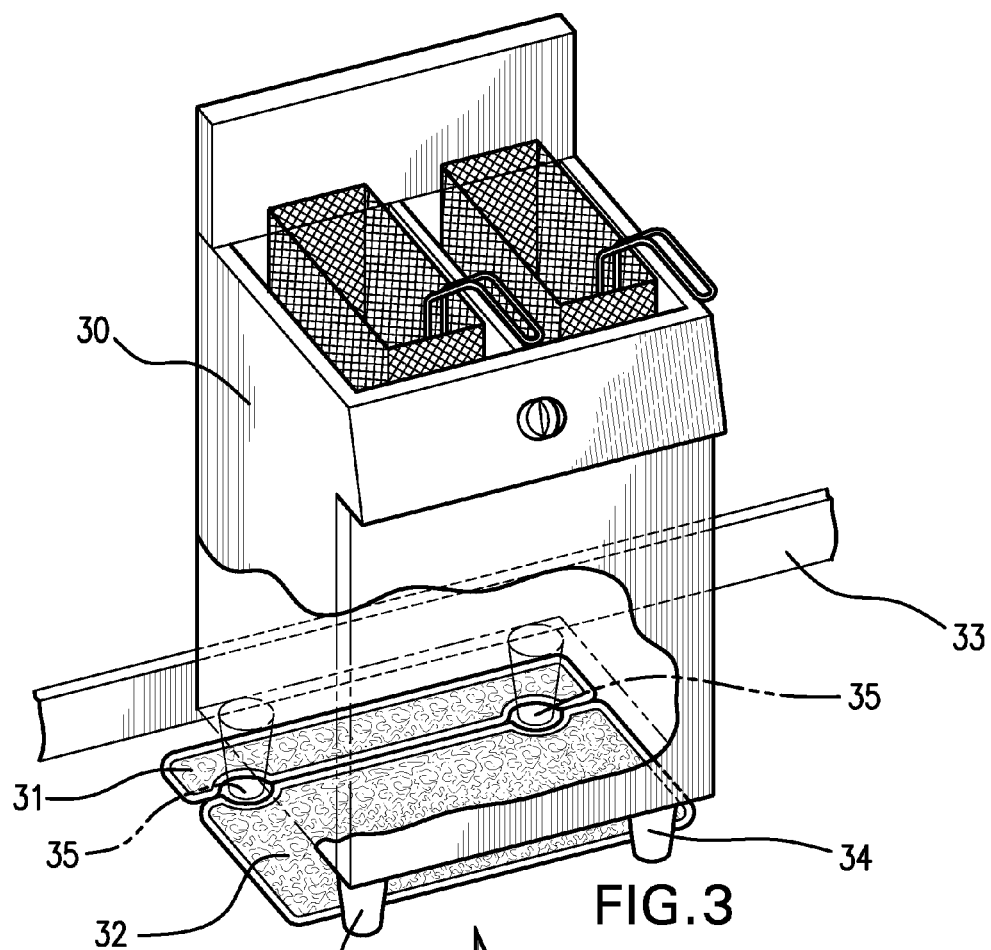
FIG. 3 provides a perspective view of the device of the present invention, as used in conjunction with a commercial frying apparatus.

The present invention comprises a mat or pad which is positioned beneath an appliance, such as a commercial cooking apparatus. A pair of such mats are shown in FIG. 1. The structure of one of the mats is shown in the cross-sectional view of FIG. 2. Both mats have the same construction, though they differ in area.

As shown in FIG. 1, mats 1 and 2 define generally flat surfaces, having lateral dimensions which are much greater than their thickness. In the embodiment shown in FIG. 1, the mats are generally rectangular, except for a pair of curved portions, such as are indicated by reference numeral 3. The curved portions allow the mats to be positioned around legs of an appliance, as will be described in more detail later.

The structure of the mats is most clearly illustrated in the cross-sectional view of FIG. 2. The mat includes a base layer, preferably comprising corrugated cardboard. As shown in FIG. 2, the cardboard comprises top and bottom layers 5 and 6, separated by corrugations 7. A liquid-resistant layer 8, preferably made of plastic, covers the top layer 5 of the cardboard. A layer of batting 9 is positioned over the plastic layer. A flange or rim 11 holds the layers together, and defines an edge around the periphery of the entire mat. The rim 11 is preferably made of hard plastic, but the material can be varied, within the scope of the invention.

FIG. 3 depicts a typical use of the mat of the present invention. FIG. 3 shows an appliance 30, which in this example is a commercial frying apparatus, under which a pair of mats 31 and 32 are positioned. Both mats 31 and 32 are constructed as described above, with respect to FIGS. 1 and 2. Mat 31 is positioned in abutment with the wall or baseboard 33, and extends from the wall or baseboard, up to approximately the level of the rear legs 35 of the appliance. Mat 32 extends substantially from the forward edge of mat 31 to front legs 34 of the appliance 30.

Mats 31 and 32 have curved portions, similar to those illustrated in FIG. 1. These curved portions allow the mats to be installed under the appliance without disturbing the appliance. That is, mat 31 can be inserted at the rear, behind the rear legs, and mat 32 can be inserted under the main body of the appliance, as shown. The installation of the mats can therefore be performed without moving the legs of the appliance. The mats can later be removed and replaced in the same manner, again without having to move or lift the appliance.

Figure 4:
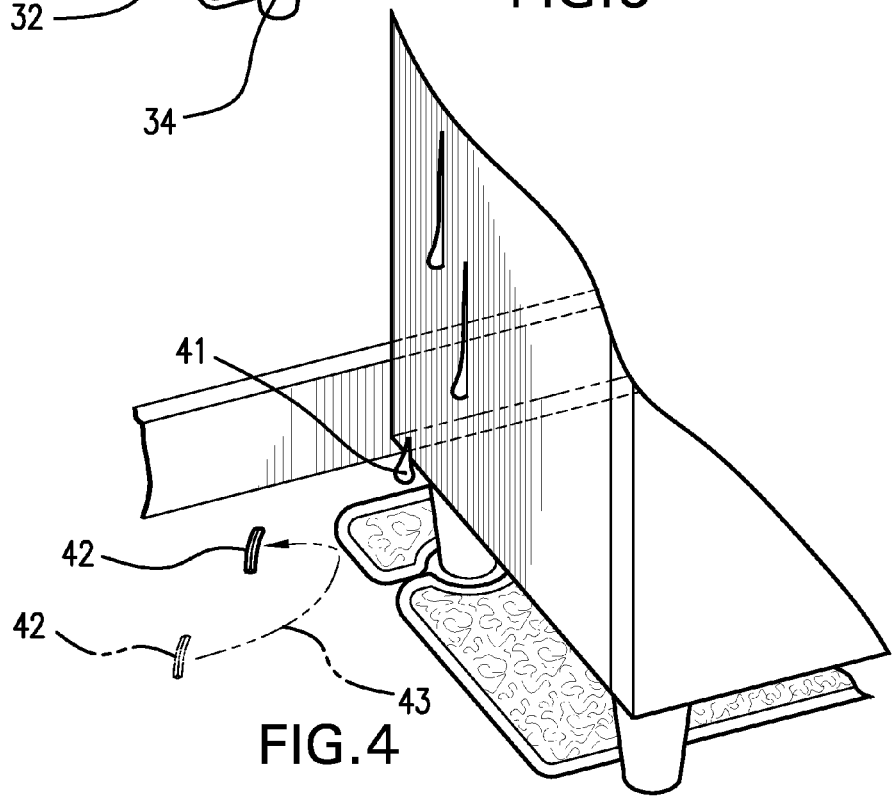
FIG. 4 provides a fragmentary perspective view of the device of FIG. 3, showing the containment of liquid spills, and the deflecting of solid food, by the mat of the present invention.

FIG. 4 illustrates the operation of the present invention, in two basic ways. First, the mat of the present invention catches liquid spills. Thus, droplet 41 is shown falling from the appliance, such that it will be caught by the mat of the present invention. Secondly, due to the inherent thickness of the mat, pieces of solid food on the floor, which may be accidentally pushed or kicked laterally, are deflected by the mat, and are thereby prevented from becoming lodged beneath the appliance. The mat therefore comprises a barrier to food that is directed laterally towards the mat.

FIG. 4 illustrates food item 42, which has been kicked or otherwise pushed along a trajectory indicated by dotted line 43. Due to the inherent thickness of the mat of the present invention, i.e. its height above the floor level, the food item bounces off the edge, and comes to rest in a location which is not underneath the appliance. Therefore, removal of this piece of food is made easy.

The batting 9 forming the top layer of the mat of the present invention is not necessarily constructed to be waterproof. Instead, the batting defines interstices within which some of the liquid may be captured. To the extent that some of the liquid seeps through the batting, it is then contained by the plastic layer 8.

The mat of the present invention is therefore generally flat. It is not intended that people walk on this mat, as the mat is positioned beneath appliances, and not normally accessible by workers in the establishment.

The mat of the present invention is of simple and inexpensive construction, and is therefore intended to be disposable. A mat of the present invention can be positioned beneath an appliance for a predetermined period, such as one to three months, and then replaced.

The exact shape of the mat of the present invention can be varied to suit different appliances. In general, the object is to cover substantially all of the area of the floor which lies immediately beneath the appliance, while providing gaps to accommodate legs, especially rear legs, of the appliance, so that the mat(s) can be installed and removed without disturbing the appliance. In the embodiment shown, these gaps are created by forming the mats with curved edges, such that pairs of curved edges define the desired gaps. The shapes of such gaps depend on the curvature of the edges. The mats may be provided with multiple curved portions, to accommodate situations in which an appliance has multiple legs.

In the pair of mats shown in FIG. 1, mat 2 is narrower than mat 1. This is because mat 2 is intended to be positioned against the wall or baseboard, and to extend to the rear legs of the appliance. Mat 1 is intended to extend from mat 2, as far as the front legs of the appliance. Therefore, mat 1 covers a larger area than does mat 2. It is preferred that mat 1 not extend beyond the front of the appliance, so that personnel will not trip over it.

It is preferred that the mat or mats, placed beneath an appliance, cover a majority of, and preferably substantially all of, the area beneath the appliance.

In the embodiment shown, the mats are placed in abutment along at least part of their straight portions, as shown in both FIGS. 1 and 3.

The invention should not be deemed limited to the specific embodiment shown. Although cardboard is a preferred material for forming the base layer of the mat, other materials could be used instead. The mat is also not intended to be limited to a plastic layer for forming the liquid barrier; other liquid-resistant materials could be used instead. The appliance is not limited to cooking apparatus; the invention may be used with other kinds of appliances. Such modifications will be apparent to the reader skilled in the art, and should be considered within the spirit and scope of the following claims.

What is claimed is:

1. A method of maintaining cleanliness beneath an appliance, the appliance having a plurality of legs, the method comprising:
   a) providing at least two mats, the mats being shaped such that they can be positioned beneath the appliance without disturbing the legs of the appliance, and
   b) sequentially positioning the mats so as to cover a majority of an area beneath the appliance,
   wherein the appliance is adjacent to a wall, and wherein the mats are selected such that there is a small mat and a large mat, and wherein step (b) comprises positioning the small mat adjacent to the wall, and positioning the large mat adjacent to the small mat,
   and wherein the appliance has a plurality of legs, and wherein step (b) comprises positioning the mats without moving the legs of the appliance.

2. The method of claim 1, wherein step (a) comprises selecting each of the mats to comprise:
   c) a base layer, the base layer defining a surface and a periphery,
   d) a liquid-resistant layer disposed on the surface of said base layer,
   e) a layer of batting disposed adjacent to said liquid-resistant layer, and
   f) a rim extending substantially around the periphery of the base layer, the rim comprising means for holding said base layer, said liquid-resistant layer, and said batting layer together.

3. The method of claim 2, wherein step (a) further comprises selecting the mats such that the periphery of each mat has at least some substantially straight portions and at least some substantially curved portions.

4. The method of claim 3, wherein step (b) includes positioning the mats such that they are in abutment along at least part of their straight portions.

5. The method of claim 1, further comprising removing the mats, and repeating steps (a) and (b) with a new set of mats.

* * * * *